United States Patent [19]
Richmond et al.

[11] Patent Number: 5,873,518
[45] Date of Patent: Feb. 23, 1999

[54] WATER VALVE ASSEMBLY HAVING A TEMPERATURE AND PRESSURE SENSING DEVICE INTEGRATED THEREIN

[75] Inventors: James W. Richmond, Carmel, Ind.; Ralph D. Furmanek, Wildwood, Mo.

[73] Assignee: Emerson Electric Co., St. Louis, Mo.

[21] Appl. No.: 819,123

[22] Filed: Mar. 17, 1997

[51] Int. Cl.⁶ .................................................. G05D 23/13
[52] U.S. Cl. ................... 236/12.12; 68/12.22; 236/92 R
[58] Field of Search ............................. 236/92 R, 93 A, 236/12.12, 12.15, 12.14; 68/12.21, 12.22, 207; 137/614.2

[56] References Cited

U.S. PATENT DOCUMENTS

| | | | |
|---|---|---|---|
| Re. 33,775 | 12/1991 | Behr et al. .................................. | 62/212 |
| 2,670,900 | 3/1954 | Branson .................................. | 236/92 R |
| 3,122,318 | 2/1964 | Null .......................................... | 236/92 R |
| 3,207,435 | 9/1965 | Erickson et al. ......................... | 236/12.12 |
| 3,337,130 | 8/1967 | Erickson .................................. | 236/12.12 |
| 4,031,911 | 6/1977 | Frazar ...................................... | 137/3 |
| 4,330,081 | 5/1982 | McMillan ................................. | 236/12 R |
| 4,643,350 | 2/1987 | DeSchaaf et al. ....................... | 236/12.12 |
| 4,697,293 | 10/1987 | Knoop ........................................ | 68/207 |
| 4,797,007 | 1/1989 | Elmore, III ............................... | 374/143 |
| 4,863,098 | 9/1989 | Kolze et al. ............................ | 236/12.12 |
| 5,020,771 | 6/1991 | Nakatsukasa et al. ................. | 251/30.02 |
| 5,077,983 | 1/1992 | Dudley ...................................... | 62/228.1 |
| 5,197,508 | 3/1993 | Gottling et al. .......................... | 137/1 |
| 5,323,803 | 6/1994 | Blumenauer ........................... | 137/614.2 |
| 5,324,114 | 6/1994 | Vinci ......................................... | 374/208 |
| 5,400,961 | 3/1995 | Tsutsui et al. .......................... | 236/12.12 |
| 5,435,145 | 7/1995 | Jaster ........................................ | 62/115 |
| 5,439,019 | 8/1995 | Quandt et al. .......................... | 236/12.12 |
| 5,577,660 | 11/1996 | Hansen .................................. | 236/12.12 |

Primary Examiner—William E. Tapolcai
Attorney, Agent, or Firm—Mark D. Becker

[57] ABSTRACT

A water valve assembly includes a valve body having defined therein (1) a first fluid inlet, (2) a temperature sensing port, (3) a fluid outlet, and (4) a fluid channel in fluid communication with the first fluid inlet, the temperature sensing port, and the fluid outlet. The assembly also includes a first water valve being in fluid communication with the first fluid inlet. The assembly also includes a sensing device having a temperature sensing surface being positioned in thermal communication with the temperature sensing port. In addition, the assembly further includes a pressure inlet member having a pressure channel defined therein. The sensing device further has a pressure sensing surface, and the pressure channel is positioned in fluid communication with the pressure sensing surface. A method of operating a water valve assembly is also disclosed.

18 Claims, 10 Drawing Sheets

WATER VALVE ASSEMBLY HAVING A TEMPERATURE AND PRESSURE SENSING DEVICE INTEGRATED THEREIN

BACKGROUND OF THE INVENTION

The present invention relates generally to a water valve assembly, and more specifically to a water valve assembly having a temperature and pressure sensing device integrated therein.

Solenoid-controlled water valve assemblies are commonly used in many household appliances such as clothes washing machine and dishwashers. Such appliance water valve assemblies typically include a cold water valve and a hot water valve and are generally controlled by a controller included in the appliance thereby providing a flow of water for use by the appliance.

The appliance typically includes a pressure switch. The pressure switch is coupled to a pressure sense line. Air pressure within the pressure sense line varies proportionally as the water level within a wash basin in the appliance changes. More specifically, as the water level within the wash basin increases, air pressure within the pressure sense line also increases, and vice versa. If the air pressure within the pressure sense line exceeds a predetermined limit associated with the switch, the switch actuates thereby causing the controller to generate an output signal which closes the cold water valve and the hot water valve thereby ceasing the flow of water into the wash basin of the appliance.

Moreover, the appliance sometimes includes a temperature sensor. The temperature sensor senses the temperature of the water entering the appliance. If the water temperature varies from a predetermined temperature, the controller generates an output signal which causes either the cold water valve or the hot water valve of the water valve assembly to open thereby providing for a flow of either cold or hot water, respectively, into the wash basin of the appliance.

One drawback associated with appliances which have heretofore been designed is that the water valve assembly, the pressure switch, and the temperature sensor are each separate, discrete devices. Such a configuration is undesirable in that separate, discrete devices generally consume more space and increase the cost associated with the appliance. This is true since each of the devices must be individually installed in the appliance thereby increasing labor cost associated with manufacturing the appliance.

What is needed therefore, is an appliance water valve assembly which has a temperature and pressure sensing device integrated therein. What is further needed is a water valve assembly which reduces the number of separate devices associated with the appliance relative to appliances which have heretofore been designed thereby reducing the cost associated with the appliance.

SUMMARY OF THE INVENTION

In accordance with a first embodiment of the present invention, there is provided a water valve assembly. The water valve assembly includes a valve body having defined therein (1) a first fluid inlet, (2) a temperature sensing port, (3) a fluid outlet, and (4) a fluid channel in fluid communication with the first fluid inlet, the temperature sensing port, and the fluid outlet. The assembly also includes a first water valve being in fluid communication with the first fluid inlet. The assembly also includes a sensing device having a temperature sensing surface being positioned in thermal communication with the temperature sensing port.

In accordance with a second embodiment of the present invention, there is provided a method of operating a water valve assembly. The method includes the step of providing a valve body having defined therein (1) a first fluid inlet, (2) a temperature sensing port, (3) a fluid outlet, and (4) a fluid channel in fluid communication with the first fluid inlet, the temperature sensing port, and the fluid outlet. The method further includes the step of positioning a first water valve in a first valve position so that a first flow of water is advanced into the fluid channel through the first fluid inlet. The method also includes the step of detecting a predetermined temperature value of a second flow of water in the fluid channel with a sensing device having a temperature sensing surface positioned in thermal communication with the temperature sensing port. Moreover, the method includes the step of moving the first water valve from the first valve position to a second valve position in response to the sensing device detecting the predetermined temperature value so as to vary the magnitude of the first flow of water through the first fluid inlet.

It is therefore an object of the present invention to provide a new and useful water valve assembly.

It is a further object of the present invention to provide an improved water valve assembly.

It is moreover an object of the present invention to provide a new and useful method of operating a water valve assembly.

It is yet another object of the present invention to provide an improved method of operating a water valve assembly.

It is also an object of the present invention to provide an appliance water valve assembly which has a temperature and pressure sensing device integrated therein.

It is a further object of the present invention to provide a water valve assembly which reduces the number of separate devices associated with the appliance relative to appliances which have heretofore been designed thereby reducing the cost associated with the appliance.

The above and other objects, features, and advantages of the present invention will become apparent from the following description and the attached drawings.

DETAILED DESCRIPTION OF THE INVENTION

While the invention is susceptible to various modifications and alternative forms, specific embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the appended claims.

Figure 1:
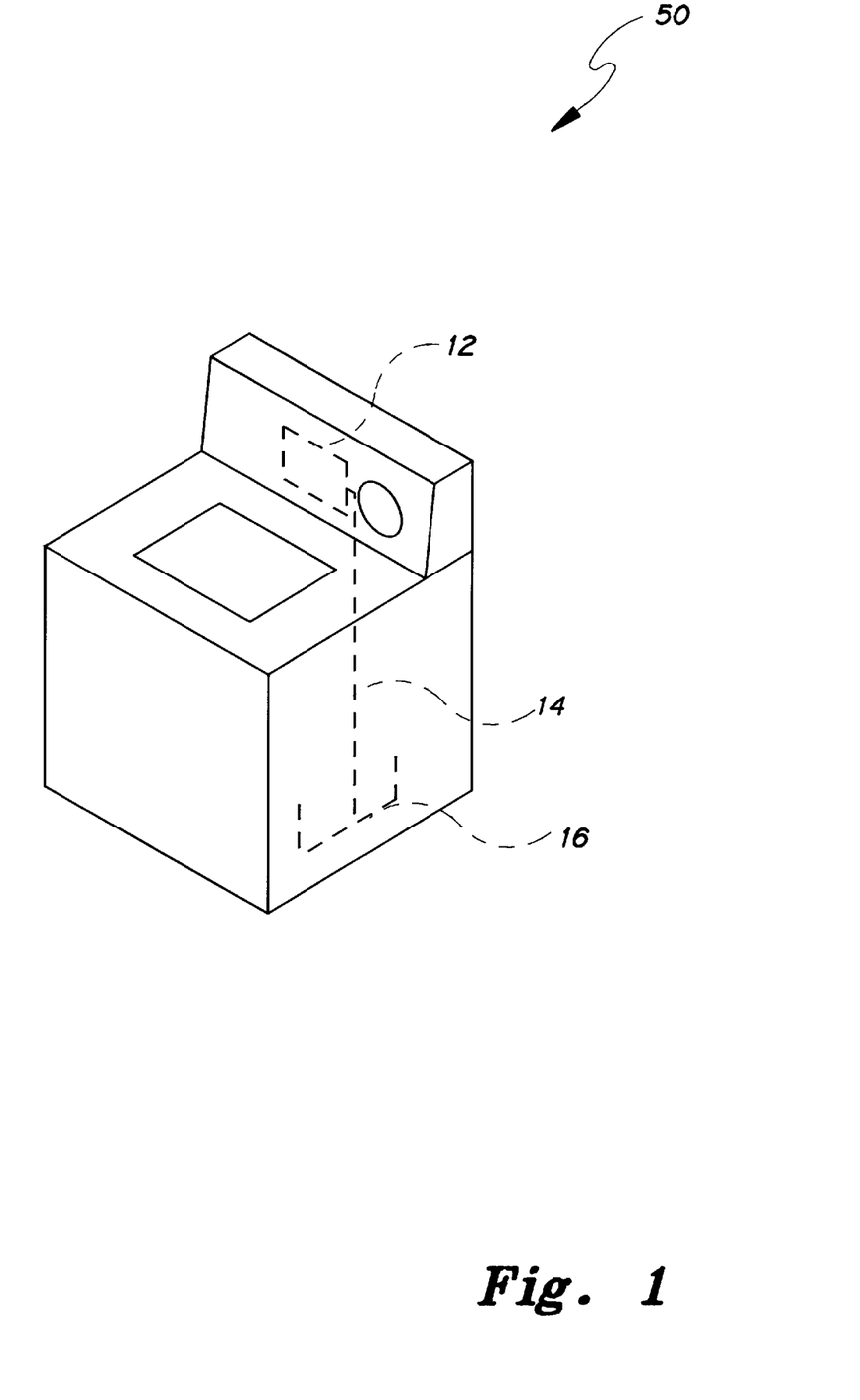
FIG. 1 is a perspective view of an appliance that includes a water valve assembly which incorporates the features of the present invention therein.

Referring now to FIG. 1, there is shown an appliance 10 such as a clothes washing machine. The appliance 10 includes a water valve assembly 12. The water valve assembly 12 controls the flow of fluid such as water into the appliance 10.

A pressure sense line 14 is in fluid communication with the water valve assembly 12 and a wash basin 16 of the appliance 10. In particular, a first end of the pressure sense line 14 is coupled to the water valve assembly 12, whereas a second end of the pressure sense line 14 is coupled to the wash basin 16. Air pressure in the pressure sense line 14 is indicative of the water level within the wash basin 16. More specifically, as the wash basin 16 fills with water, the pressure sense line 14 also fills with water thereby compressing the air within the pressure sense line 14. Hence, as the water level within the wash basin 16 increases, air pressure within the pressure sense line 14 likewise increases. It should be appreciated that as the water level within the wash basin 16 decreases (i.e. the wash basin is drained), air pressure within the pressure sense line also decreases. As shall be discussed in more detail below, the water valve assembly 12 senses the air pressure within the pressure sense line 14 in order to adjust the flow of water into the wash basin 16 of the appliance 10.

Figure 3:
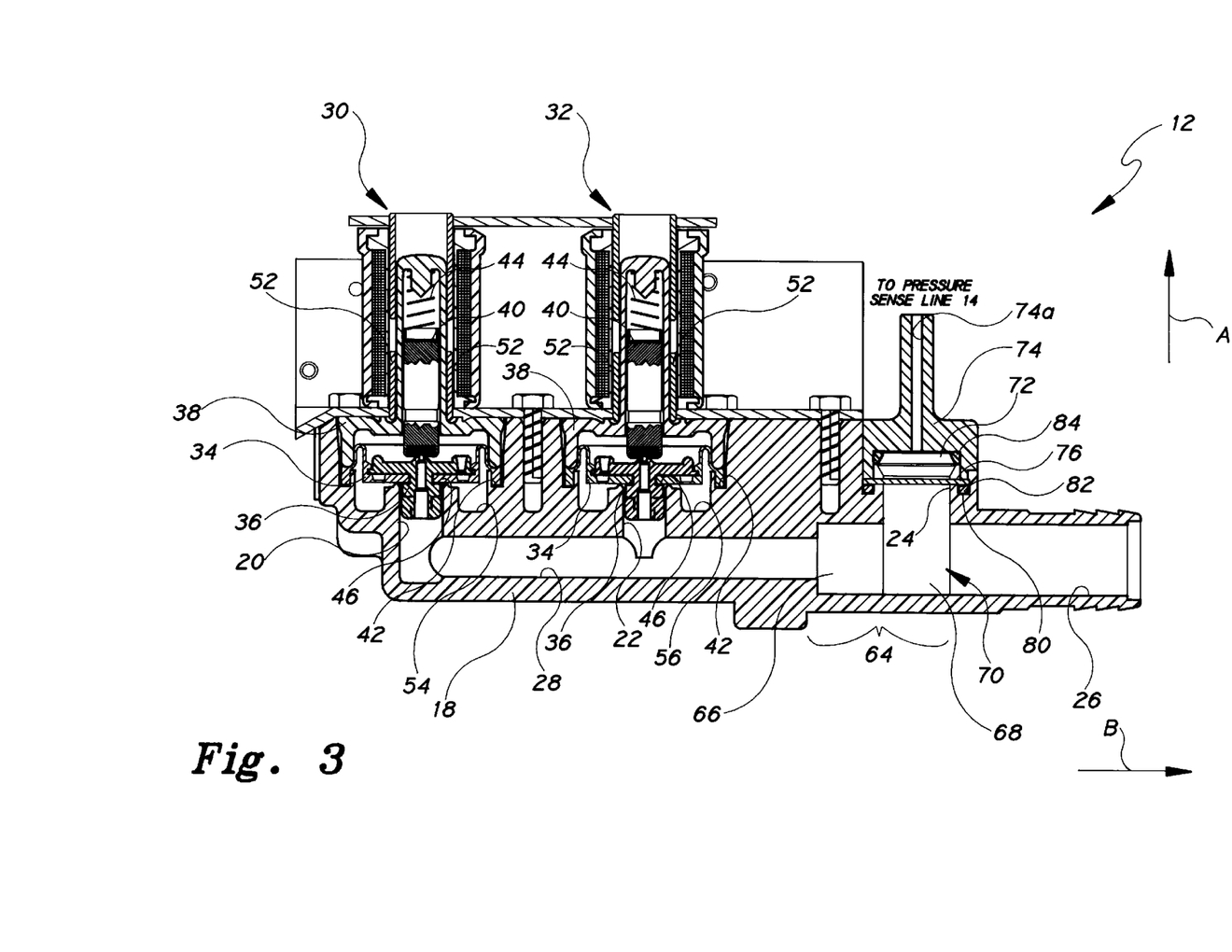
FIG. 3 is an enlarged cross-sectional view taken along the line 3—3 of FIG. 2, as viewed in the direction of the arrows.
Figure 4:
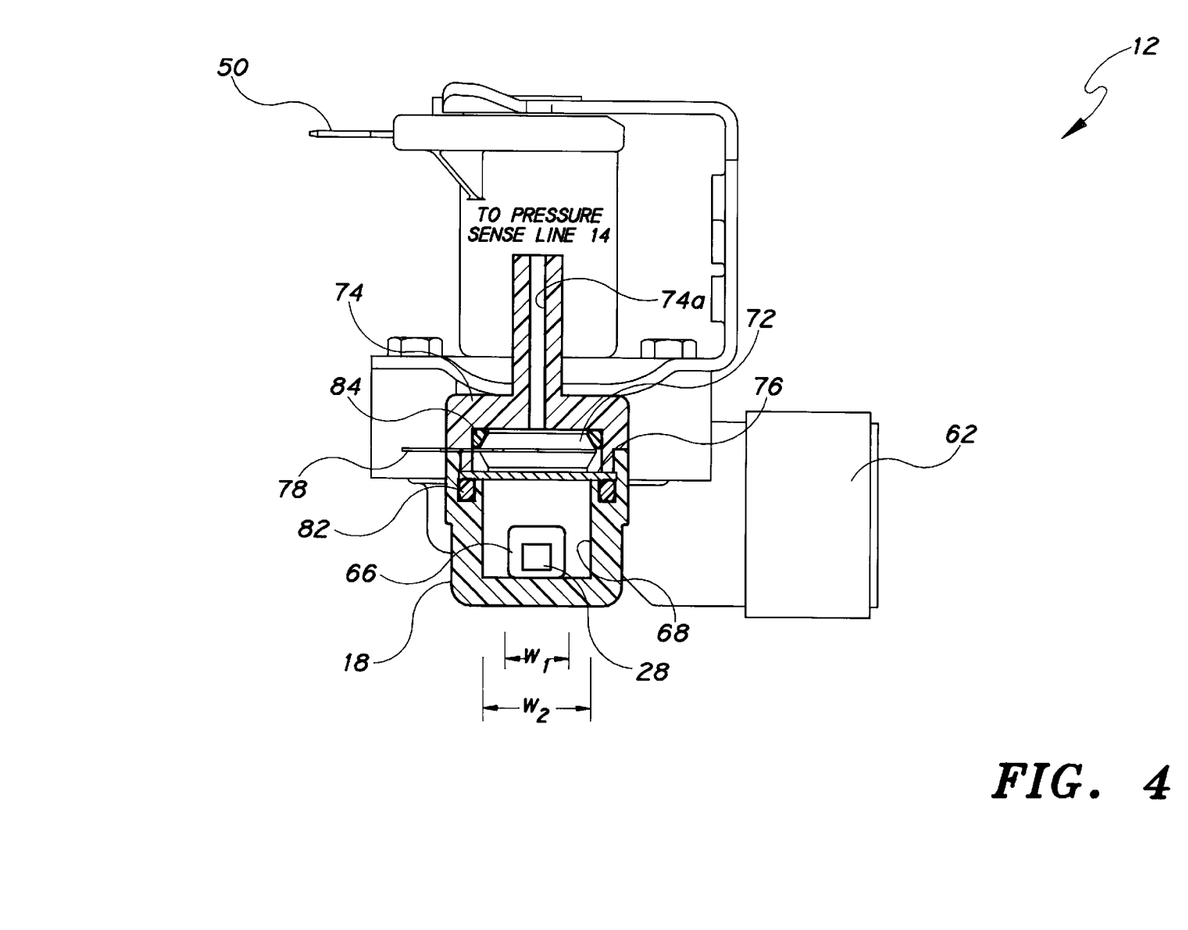
FIG. 4 is an enlarged cross-sectional view taken along the line 4—4 of FIG. 2, as viewed in the direction of the arrows.
Figure 5:
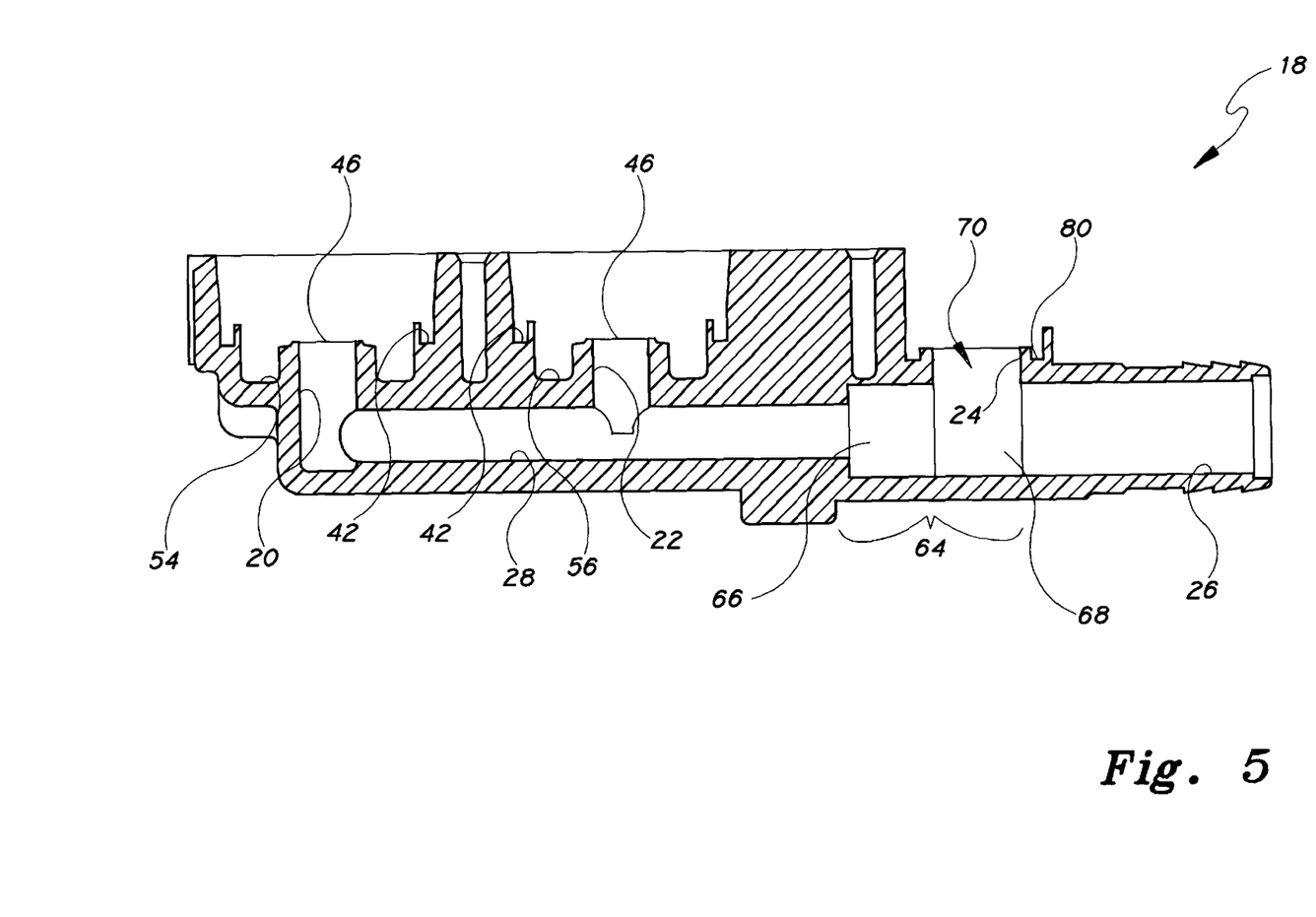
FIG. 5 is a cross-sectional view of the valve body of the water valve assembly of FIG. 3.

Referring now to FIGS. 2–5, there is shown the water valve assembly 12 in more detail. The water valve assembly 12 includes a valve body 18. As shown in FIG. 5, the valve body 18 has a cold water inlet 20, a hot water inlet 22, a pressure sensing port 24, and a water outlet 26 defined therein. The valve body further includes a fluid channel 28 defined therein. The fluid channel 28 is in fluid communication with, and coupled to, each of the cold water inlet 20, the hot water inlet 22, the pressure sensing port 24, and the water outlet 26. The valve body 18 is an integrally molded, single part as shown in FIG. 5. The valve body 18 is made of a plastic material such as polypropylene.

The water valve assembly 12 also includes a solenoid-controlled cold water valve 30 and a hot water valve 32. Both the cold water valve 30 and the hot water valve 32 includes a diaphragm 34, a diaphragm insert 36, a guide tube 38, and an armature 40. Both the cold water valve 30 and the hot water valve 32 is sealingly engaged to the valve body 18 at a retention groove 42 (see FIG. 5). The armature 40 is disposed in the guide tube 38, and is biased against the diaphragm insert 36 by a spring 44 thereby urging the diaphragm insert 36 and the diaphragm 34 against a valving surface 46. The diaphragm 34 is made of a flexible material, such as ethylene propylene (EP) rubber thereby providing desirable sealing characteristics when biased against the valving surface 46.

Figure 2:
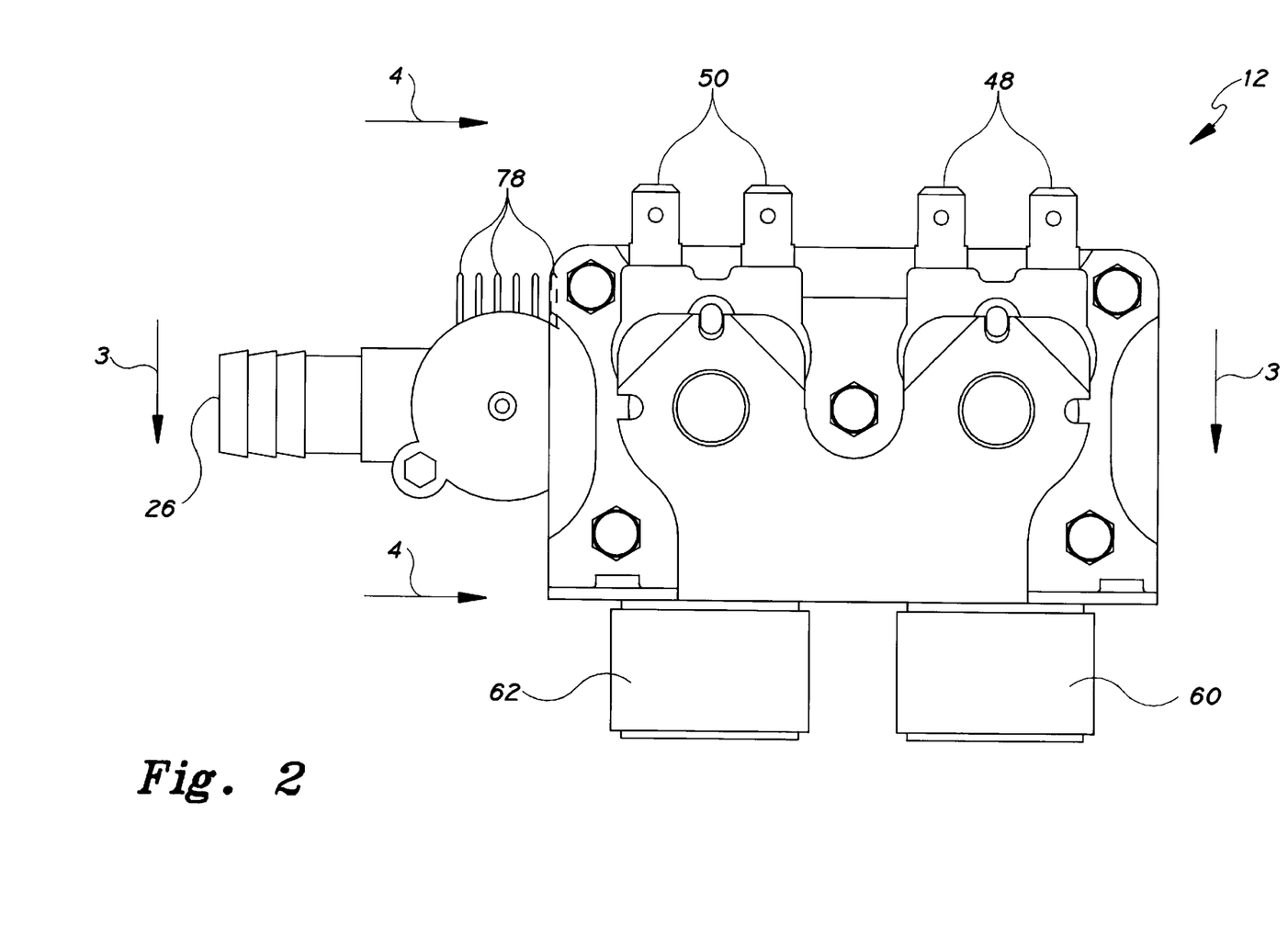
FIG. 2 is a top elevational view of the water valve assembly of the appliance of FIG. 1.

Upon application of an electric current to a pair terminals 48, 50 (see FIG. 2) associated with the cold water valve 30 and the hot water valve 32, respectively, a magnetic field is generated on a number of pole pieces 52 thereby urging the armature 40 in the general direction of arrow A of FIG. 3. When the armature 40 is urged in the general direction of arrow A, the diaphragm insert 36 and hence the diaphragm 34 are likewise urged in the general direction of arrow A thereby causing the diaphragm 34 to be spaced apart from the valving surface 46.

The valve body 18 further includes a pair of valving chambers 54, 56 as shown in FIG. 5. When the water valves 30, 32 are positioned in a closed position, such as shown in FIG. 3, the diaphragm 34 is biased against the valving surface 46 thereby preventing water from flowing out of the valving chambers 54, 56, through the fluid inlets 20, 22, respectively, and into the fluid channel 28. However, when the cold water valve 30 is positioned in an open position, i.e. a position in which the diaphragm 34 is spaced apart from the valving surface 46 as described above, water is permitted to flow out of the valving chamber 54, through the cold water inlet 20, and into the fluid channel 28. Similarly, when the hot water valve 32 is positioned in an open position, i.e. a position in which the diaphragm 34 is spaced apart from the valving surface 46, water is permitted to flow out of the valving chamber 56, through the hot water inlet 22, and into the fluid channel 28.

The water valve assembly 12 further includes a cold water coupling 60 and a hot water coupling 62 as shown in FIG. 2. The couplings 60, 62 are typically connected to a residential water line (not shown) thereby respectively providing for a cold water flow and a hot water flow to the water valves 30, 32, respectively. The water outlet 26 is typically a tube-type connector which is connected to a water fill line (not shown) of the appliance 10.

The valve body 18 also includes a mixing segment 64 defined therein as shown in FIG. 3. The mixing segment 64 includes a first fluid channel segment 66 and a second fluid channel segment 68. Collectively, the first fluid channel segment 66 and the second fluid channel segment 68 of the mixing segment 64 are referred to as a mixing chamber 70. The temperature sensing port 24 is defined in the second fluid channel segment 68 of the mixing segment 64 as shown in FIG. 5.

The mixing chamber 70 is configured to create a combined flow of water from the cold water flow advancing from the cold water inlet 20 and the hot water flow advancing from the hot water inlet 22. In particular, the width ($W_1$) of the first fluid channel segment 66 is configured to be smaller in magnitude than the width ($W_2$) of the second fluid channel segment 68 as shown in FIG. 4. Such a configuration causes turbulence as water flows in the general direction of arrow B of FIG. 3. The presence of turbulence causes the water within the mixing chamber to be mixed or otherwise combined as the water passes therethrough. It should therefore be appreciated that a flow of cold water from the cold water inlet 20 and a flow of hot water from the hot water inlet 22 are mixed with one another in the mixing chamber 70 thereby creating a resultant flow of water with a relatively uniform temperature for advancement through the outlet 26 and into the wash basin 16 of the appliance 10 (see FIG. 1).

The water valve assembly 12 further includes a sensing device 72, a pressure inlet member 74, and a thermal conductor 76. The pressure inlet member 74 has a pressure channel 74a defined therein which is coupled to the pressure sense line 14 (see FIG. 1). As discussed above, air pressure in the pressure sense line 14 increases as the wash basin 16 (see FIG. 1) of the appliance 10 fills with water. Therefore, the air pressure within the pressure channel 74a will likewise increase as the wash basin 16 fills with water. Such air pressure, referred to hereinafter as a "water level pressure", may be monitored in order to determined when it is desirable to add additional water to the wash basin 16. More specifically, if the water level pressure is below a predetermined value, it may be desirable to add more water to the wash basin 16 thereby increasing the amount of water therein and hence increasing the water level pressure within the pressure sense line 14 and the pressure channel 74a. Once the water level pressure within the pressure sense line 14 and therefore the pressure channel 74a reaches the predetermined value, the water valve assembly 12 is operated so as to prevent additional water from being added to the wash basin 16.

Figure 6:
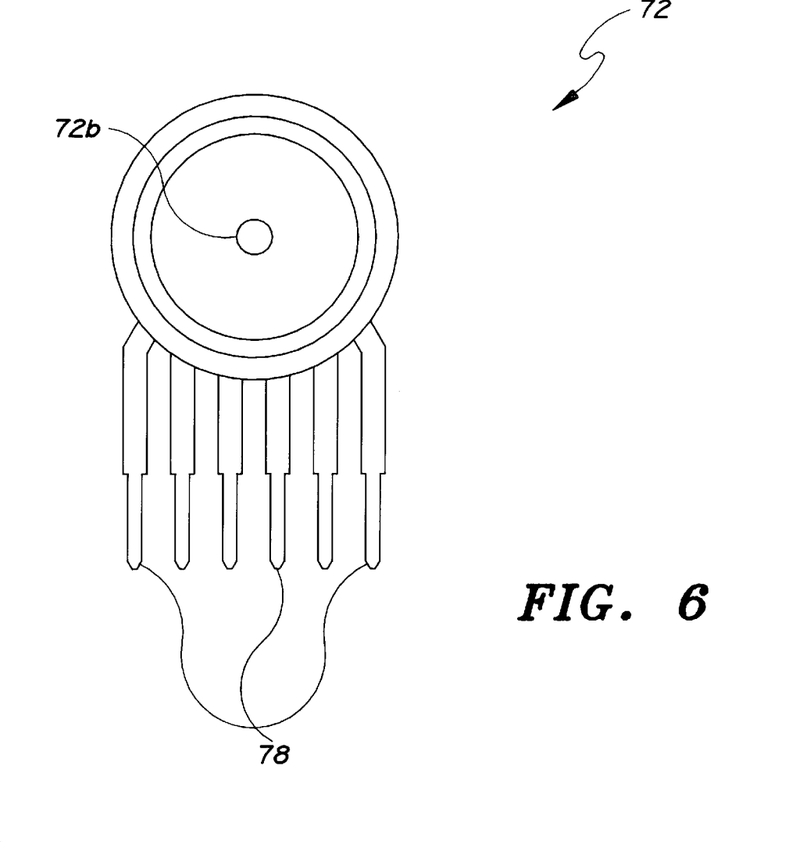
FIG. 6 is an enlarged top elevational view of the sensing device of the water valve assembly of FIG. 2.
Figure 7:
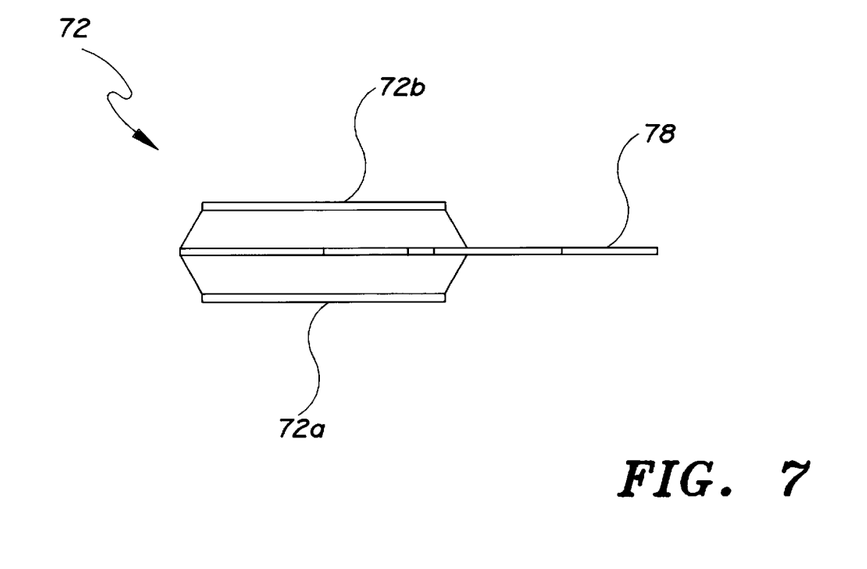
FIG. 7 is a side elevational view of the sensing device of FIG. 6.

The sensing device 72 is provided to sense or otherwise detect (1) the temperature of the water within the mixing chamber 70, and (2) the water level pressure within the pressure channel 74a. Moreover, the sensing device 72 includes a number of output terminals 78 (see FIGS. 67). The sensing device 72 generates a number of output signals on the output terminals 78 in response to (1) the temperature of the water within the mixing chamber 70, and (2) the water level pressure within the pressure channel 74a. As shall be discussed in more detail below, the output signals are transmitted to an electronic control circuit 92 (see FIG. 10) in order to control the operation of the water valve assembly 12. One type of sensing device 72 that may be used in the present invention is a model number XPX1375DP integral pressure and temperature sensor which is available from Motorola Incorporated of Phoenix, Arizona.

The sensing device 72 includes a temperature sensing surface 72a as shown in FIG. 7. The temperature sensing surface 72a is positioned in contact with the thermal conductor 76 as shown in FIG. 3. The thermal conductor 76 may be any metallic member which has relatively efficient heat-transferring characteristics for transferring the thermal energy or heat from the water within the mixing chamber 70 to the temperature sensing surface 72a of the sensing device 72. One such metallic member which may be used in the present invention is a copper disc.

The valve body 18 has a gasket recess 80 defined therein as shown in FIG. 5. The gasket recess 80 surrounds the temperature sensing port 24. A gasket 82 is positioned within the gasket recess 80 in order to create a seal between the thermal conductor 76 and the valve body 18. The gasket 82 is made of an elastomeric material such as rubber.

The sensing device 72 further includes a pressure sensing surface 72b as shown in FIGS. 6–7. The pressure sensing surface 72b is in fluid communication with the pressure channel 74a of the pressure inlet member 74. A sealing member 84 seals the periphery of the pressure sealing surface 72b within the pressure inlet member 72. One type of sealing member 84 which may be used in the present invention is a rubber "O-ring".

Figure 8:
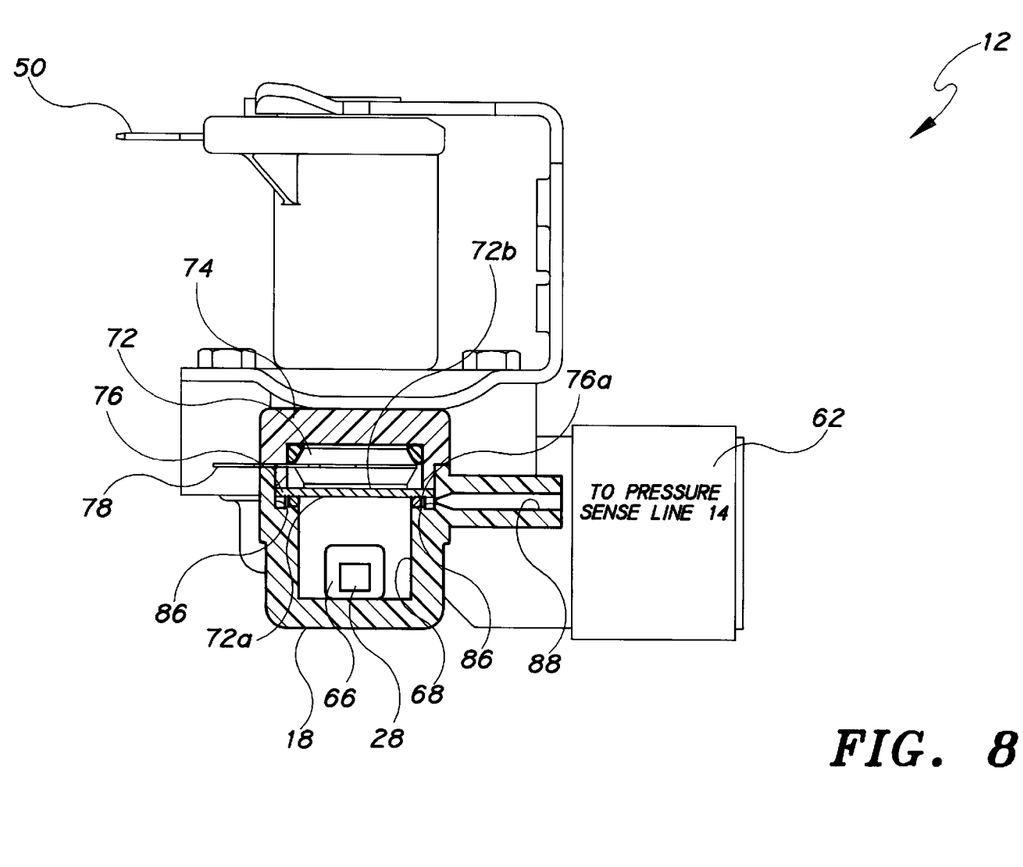
FIG. 8 is a view similar to FIG. 4, but showing a second embodiment of a water valve assembly which incorporates the features of the present invention therein.
Figure 9:
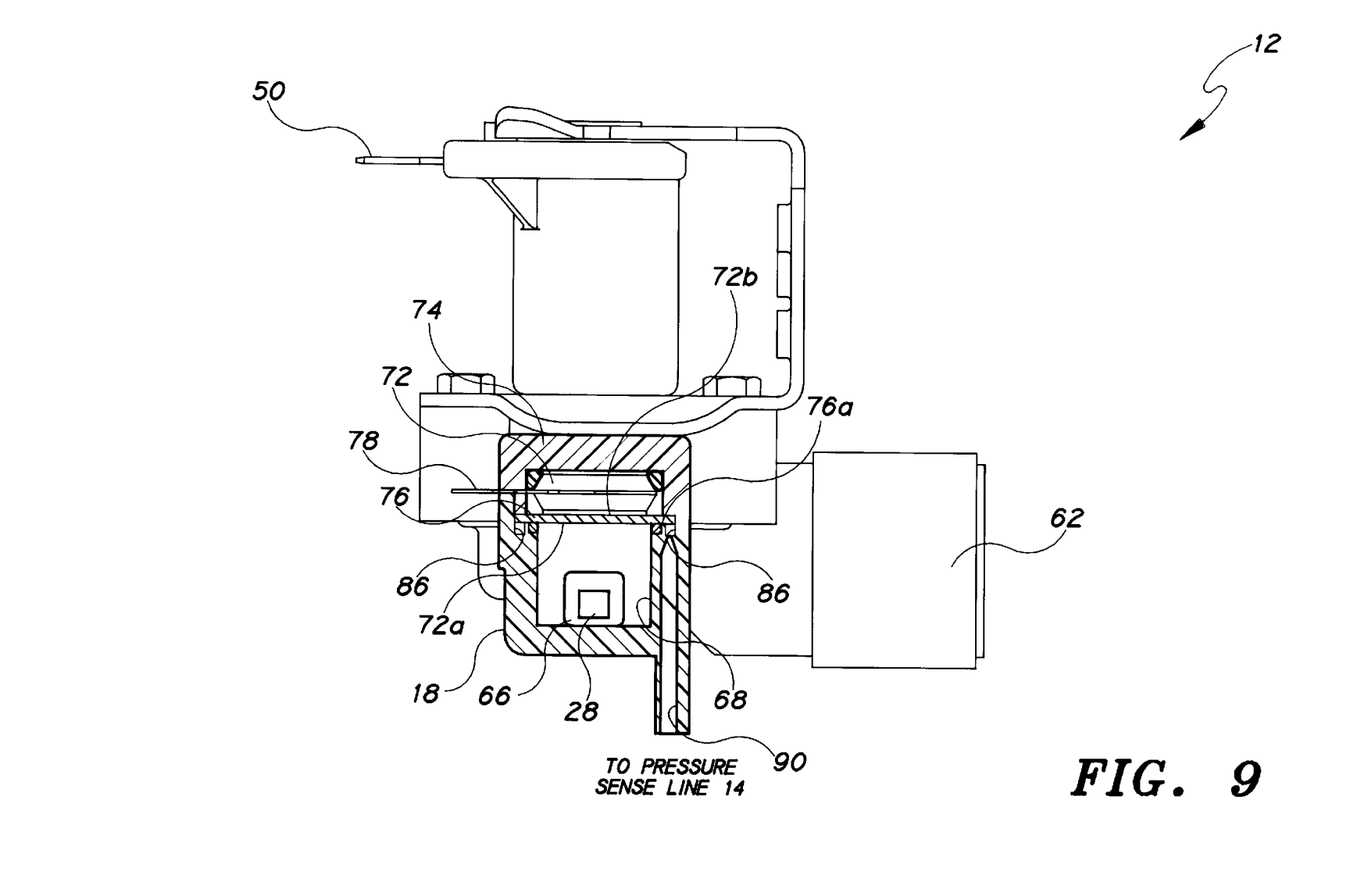
FIG. 9 is a view similar to FIG. 4, but showing a third embodiment of a water valve assembly which incorporates the features of the present invention therein.

Although in FIGS. 3–4 and 6–7, the temperature sensing surface 72a and the pressure sensing surface 72b are shown on opposite sides of the sensing device 72, it should be appreciated that the temperature sensing surface 72a and the pressure sensing surface 72b may be included on the same side of the sensing device 72 as shown in FIGS. 8 and 9. In particular, the valve body 18 may have a groove 86 defined therein which is in fluid communication with a pressure channel 88, 90 (e.g. an air pressure may be communicated through the pressure channel 88, 90). As with the pressure channel 74a, the pressure channel 88, 90 is in fluid communication with the pressure sense line 14 of the appliance 10 (see FIG. 1). Moreover, the thermal conductor 76 may have a notch 76a defined therein thereby creating an air path through which the water level pressure may be communicated from the groove 86 to the pressure sensing surface 72b of the sensing device 72. Note that in FIGS. 8 and 9, the side of the thermal conductor 76 which contacts the temperature sensing surface 72a has defined therein has a number of grooves (not shown) for allowing the sensing surface 72a to be in fluid communication with the notch 76a so as to enable the sensing surface 72a to sense the pressure within the pressure channel 88, 90. Alternatively, the side of the thermal conductor 76 which contacts the temperature sensing surface 72a may have a rough finish such as a knurled finish so that the sensing surface 72a is enabled to be in fluid communication with the notch 76a thereby enabling the sensing surface 72a to sense the pressure within the pressure channel 88, 90.

Figure 10:
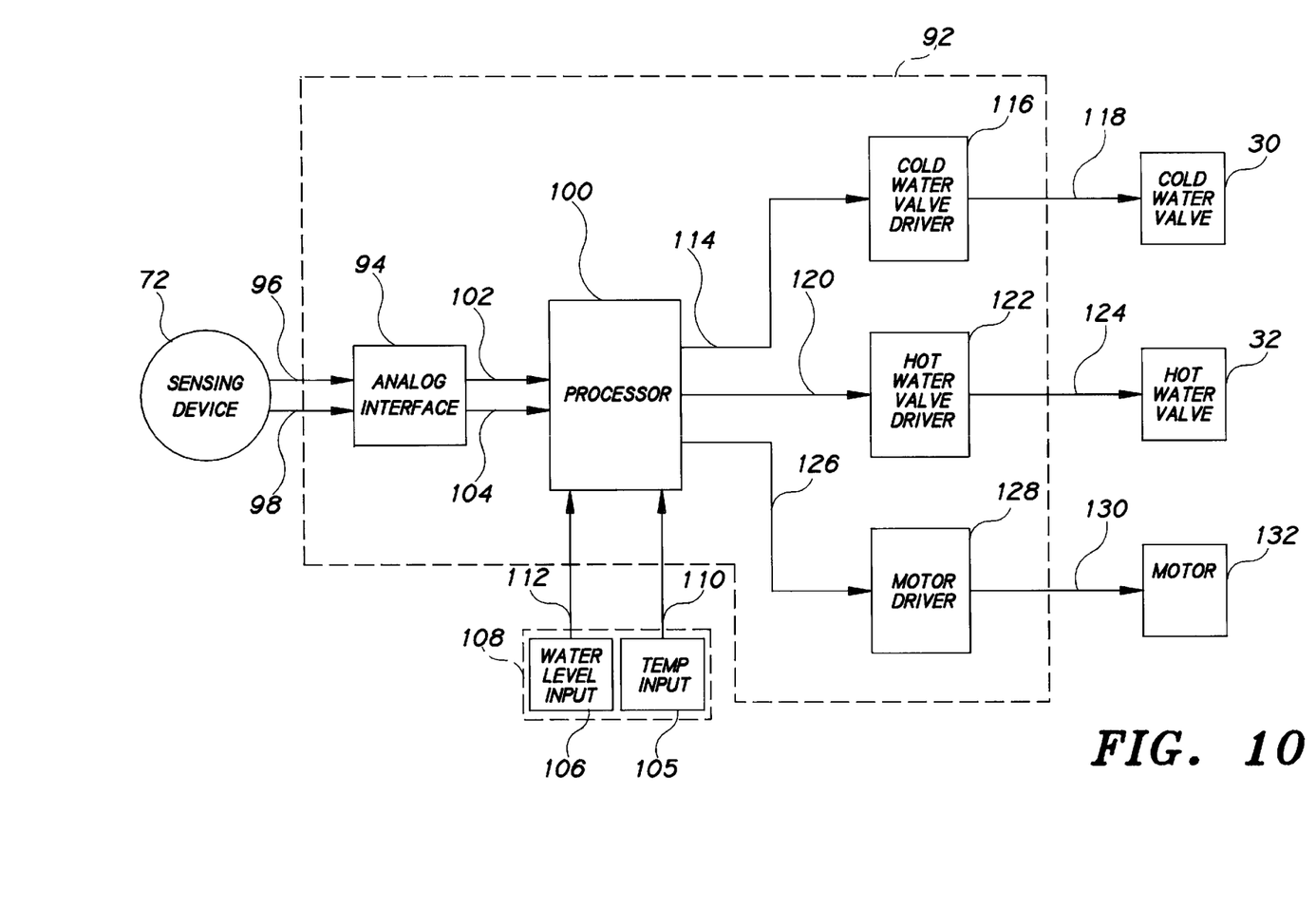
FIG. 10 is a simplified block diagram showing the relationship between the sensing device of FIG. 6 and the electrical control circuit of the appliance of FIG. 1.

Referring now to FIG. 10, the sensing device 72 is electrically coupled to the electronic control circuit 92. In particular, the output terminals 78 (see FIGS. 6–7) of the sensing device 72 are coupled to an analog interface circuit 94 via a signal line 96 and a signal line 98. The signal line 96 is electrically coupled to the temperature sensing surface 72a of the sensing device 72, whereas the signal line 98 is electrically coupled to the pressure sensing surface 72b of the sensing device 72. It should be appreciated that although the signal lines of FIG. 10 (e.g. signal lines 96, 98) are shown as single lines for ease of illustration, any number of signal lines may be included in each of the lines which are shown.

The analog interface circuit 94 converts the output signals from the sensing unit 72 into a signal which is suitable for presentation to an input of a microprocessor 100. In particular, the analog interface circuit 94 converts the output signals on the lines 96, 98 into amplified analog voltages which are in turn transmitted to the microprocessor 100 via a pair of signal lines 102, 104, respectively. It should be appreciated that the magnitude of the analog voltage on the signal line 102 is indicative of the temperature of the water in the mixing chamber 70 (see FIG. 3), whereas the magnitude of the analog voltage on the signal line 104 is indicative of the water level in the wash basin of the appliance 10 (see FIG. 1).

The microprocessor 100 converts the analog voltage on each of the signal lines 102, 104 into a digital value via an internal analog-to-digital (A/D) converter. Once such microprocessor with an internal A/D converter which may be used in the present invention is a model number 68HC05-P9 which is commercially available from Motorola, Incorporated.

A user of the appliance 10 inputs a desired water temperature via a temperature input 105 and a desired water level via a water level input 106 when the user activates the appliance 10. For example, the user activates a clothes washing machine by turning a knob or the like associated with an appliance control 108 to a desired setting which includes water temperature (e.g. cold, warm, or hot), and water level (e.g. small, medium, or large capacity). The temperature input 105 is electrically coupled to the microprocessor 100 via a signal line 110, whereas the water level 106 is electrically coupled to the microprocessor 100 via a signal line 112.

The microprocessor 100 compares the actual value of the water temperature and the water level which was received via the signal lines 102, 104, respectively, with the respective desired value of the water temperature and the water level which was received via the signal lines 110, 112, respectively.

If the microprocessor 100 determines that additional cold water is needed in the wash basin 16 of the appliance 10 (see FIG. 1), an output signal is generated on a signal line 114. The presence of a signal on the signal line 114 excites a cold water valve driver 116 thereby causing a signal to be generated on a signal line 118. It should be appreciated that the cold water valve driver may be any known semiconductor switching device such as a triac.

The signal line 118 is electrically coupled to the terminals 48 of the cold water valve 30 (see FIG. 2). When the microprocessor 100 causes a signal to be generated on the signal line 118 and hence the electrical terminals 48 in the manner described above, the cold water valve 30 is moved from the closed position to the open position thereby causing cold water to be advanced through the cold water inlet 20 and into the fluid channel 28 (see FIG. 3).

Similarly, if the microprocessor 100 determines that additional hot water is needed in the wash basin 16 of the appliance 10 (see FIG. 1), an output signal is generated on a signal line 120. The presence of a signal on the signal line 120 excites a hot water valve driver 122 thereby causing a signal to be generated on a signal line 124. As with the cold water valve driver 116, the hot water valve driver may be any known semiconductor switching device such as a triac.

The signal line 124 is electrically coupled to the terminals 50 of the hot water valve 32 (see FIG. 2). When the microprocessor 100 causes a signal to be generated on the signal line 124 and hence the electrical terminals 50 in the manner described above, the hot water valve 32 is moved from the closed position to the open position thereby causing hot water to be advanced through the hot water inlet 22 and into the fluid channel 28 (see FIG. 3).

If the microprocessor 100 determines that no additional cold or hot water is needed and that the wash basin 16 of the appliance 10 (see FIG. 1) has been filled to the desired level, an output signal is generated on a signal line 126. The presence of a signal on the signal line 126 excites a motor driver 128 thereby causing a signal to be generated on a signal line 130. It should be appreciated that the motor driver 128 may be any known switching device such as a relay.

The signal line 130 is electrically coupled to a motor 132 of the appliance 10. When the microprocessor 100 causes a signal to be generated on the signal line 130 in the manner described above, the motor 132 is actuated thereby causing an agitator or the like (not shown) associated with the appliance 10 to be driven.

While the invention has been illustrated and described in detail in the drawings and foregoing description, such illustration and description is to be considered as exemplary and not restrictive in character, it being understood that only the preferred embodiments have been shown and described and that all changes and modifications that come within the spirit of the invention are desired to be protected.

Figure 11:
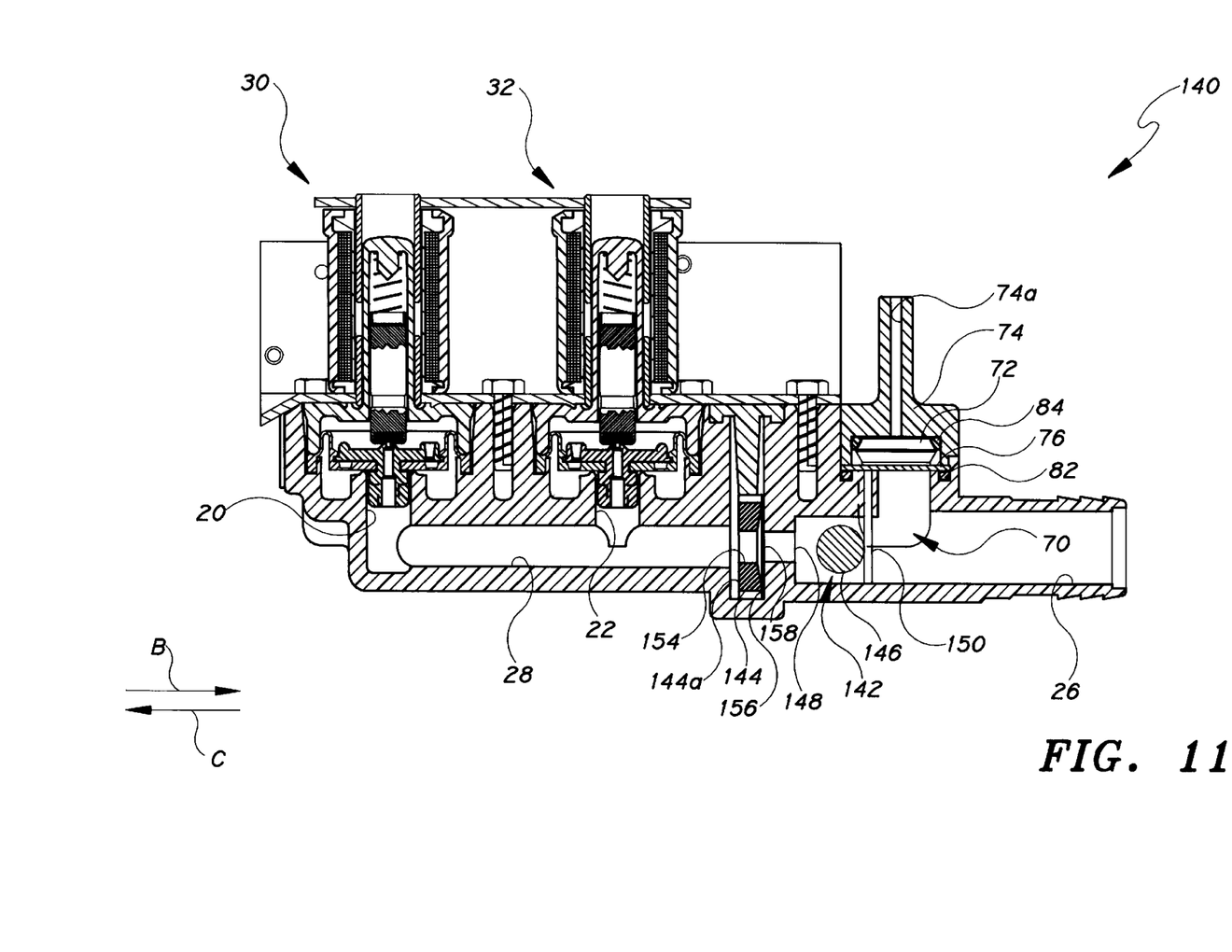
FIG. 11 is a view similar to FIG. 3, but showing a fourth embodiment of a water valve assembly which incorporates the features of the present invention therein.

For example, an additional embodiment of a water valve assembly 140 is shown in FIG. 11. In FIG. 11, the same reference numerals are used to designate the same components shown in FIGS. 1–10 which were discussed above. The water valve assembly 140 is essentially the same as the water valve assembly 12, except that a check valve assembly 142 and a flow control member 144 have been positioned in the fluid channel 28. In particular, the check valve assembly 142 and the flow control member 144 are positioned downstream from both the cold water inlet 22 and the hot water inlet 24, but upstream from the water outlet 26.

The check valve assembly 142 includes a ball 146, a ball seat 148, and a retaining pin 150. The ball 146 cooperates with the ball seat 148 in order to prevent a reverse flow of water from advancing through the water valve assembly 140. In particular, if water flows from the water outlet 26 in the general direction of arrow C of FIG. 11, the ball 146 is urged in the general direction of arrow C and into contact with the ball seat 148 thereby preventing water from advancing through the ball seat 148 and through the flow control member 144. The retaining pin 150 is provided to retain the ball 146 within the fluid channel 28 thereby preventing the ball 146 from being swept out of the water valve assembly 140 through the water outlet 26 by the force of the water advancing through the fluid channel 28.

The flow control member 144 provides for a flow of water at a constant rate through the water outlet 26. In particular, the flow control member 144 is made of flexible material such as ethylene propylene (EP) rubber, and has a central passage 154 defined therein. The flow control member 144 flexes or deforms in response to variations in inlet water pressure exerted on an upstream surface 144a thereof. In particular, a higher inlet water pressure on the upstream surface 144a causes a greater amount of flexing or deformity of the flow control member 144, thereby reducing the diameter of the central passage 154. A lower inlet water pressure exerted on the upstream surface 144a, causes the flexing or deformity of the flow control to be reduced, thereby increasing the diameter of the central passage 154.

A washer 156 has a washer orifice 158 defined therein, and provides a surface on which the flow control member 144 is supported. The washer 156 is typically made of a metallic material, such as stainless steel.

What is claimed is:

1. A water valve assembly, comprising:

a valve body having defined therein (1) a first fluid inlet, (2) a temperature sensing port, (3) a fluid outlet, (4) a fluid channel in fluid communication with said first fluid inlet, said temperature sensing port, and said fluid outlet, and (5) a pressure inlet member;

a first water valve being in fluid communication with said first fluid inlet;

a sensing device having a temperature sensing surface being positioned in thermal communication with said temperature sensing port and having a pressure sensing surface in fluid communication with said pressure inlet member.

2. The assembly of claim 1, further comprising a second water valve, wherein:

said valve body further has a second fluid inlet defined therein, said second water valve is in fluid communication with said second fluid inlet; and a first flow of water advances into said fluid channel through said first fluid inlet;

a second flow of water advances into said fluid channel through said second fluid inlet;

said valve body includes a mixing segment positioned (1) downstream of both said first fluid inlet and said second fluid inlet, and (2) upstream of said fluid outlet;

said mixing segment has said temperature sensing port defined therein.

3. The assembly of claim 2, wherein:

said mixing segment includes (1) a first fluid channel segment having a first width, and (2) a second fluid channel segment having a second width, and said first width is different from said second width.

4. The assembly of claim 2, further comprising a thermal conductor interposed between said temperature sensing surface of said sensing device and said temperature sensing port.

5. The assembly of claim 4, wherein said thermal conductor includes a metallic member.

6. The assembly of claim 4, wherein:

a gasket recess is defined in said valve body, said gasket recess surrounds said temperature sensing port, a gasket is positioned in said gasket recess, and said thermal conductor covers said temperature sensing port and contacts said gasket.

7. The assembly of claim 1, wherein:

said sensing device includes an output terminal, said sensing device generates an output signal on said output terminal in response to detecting a predetermined temperature value of a flow of water in said fluid channel, said first water valve is electrically coupled to said output terminal, and said first water valve moves from a first valve position to a second valve position in response to receipt of said output signal on said output terminal.

8. The assembly of claim 1, wherein:

said sensing device senses a water level pressure in said pressure inlet member, and said pressure inlet member is further positioned in fluid communication with a basin of a washing machine.

9. The assembly of claim 1, wherein said valve body is an integrally molded single part having said first fluid inlet, said temperature sensing port, and said fluid outlet defined therein.

10. The assembly of claim 1, wherein:

said sensing device includes an output terminal, said sensing device generates an output signal on said output terminal in response to detecting a predetermined pressure value within said pressure inlet member, said first water valve is electrically coupled to said output terminal, and said first water valve moves from a first valve position to a second valve position in response to receipt of said output signal on said output terminal.

11. The assembly of claim 1, further comprising:

a check valve positioned within said fluid channel for preventing a reverse flow of water from advancing from said fluid outlet to said first fluid inlet; and a flow control member positioned within said fluid channel, said flow control member having a central passage defined therein through which a forward flow of water advances, wherein said check valve and said flow control member are each interposed between said first fluid inlet and said fluid outlet.

12. A method of operating a water valve assembly, comprising the steps of:

providing a valve body having defined therein (1) a first fluid inlet, (2) a temperature sensing port, (3) a fluid outlet, (4) a fluid channel in fluid communication with said first fluid inlet, said temperature sensing port, and said fluid outlet, and (5) a pressure inlet member having a pressure channel therein;

positioning a first water valve in a first valve position so that a first flow of water is advanced into said fluid channel through said first fluid inlet;

detecting a predetermined temperature value of a second flow of water in said fluid channel with a sensing device having a temperature sensing surface positioned in thermal communication with said temperature sensing port;

sensing a predetermined pressure value within said pressure channel with said sensing device having a pressure sensing surface in fluid communication with said pressure channel;

moving said first water valve from said first valve position to a second valve position in response to said sensing device detecting said predetermined temperature value so as to vary the magnitude of said first flow of water through said first fluid inlet; and moving said first water valve from said second valve position to a third valve position in response to said sensing device sensing said predetermined pressure value so as to vary the magnitude of said first flow of water through said first fluid inlet.

13. The method of claim 12, wherein:

said sensing step includes the step of sensing a fluid level in a wash basin of a washing machine.

14. The method of claim 12, wherein:

a thermal conductor is interposed between said temperature sensing surface and said temperature sensing port, and said detecting step includes the step of transferring heat from said second flow of water to said temperature sensing surface with said thermal conductor.

15. The assembly of claim 14, wherein said thermal conductor includes a metallic member.

16. The method of claim 12, wherein said valve body is an integrally molded single part having said first fluid inlet, said temperature sensing port, and said fluid outlet defined therein.

17. The method of claim 12, wherein said water valve assembly includes a check valve and a flow control member, said check valve and said flow control member both being (1) positioned within said fluid channel, and (2) interposed between said first fluid inlet and said fluid outlet, further comprising the steps of:

preventing a reverse flow of water from advancing from said fluid outlet to said first fluid inlet with said check valve; and controlling the flow rate of a forward flow of water with said flow control member.

18. The method of claim 12, wherein said valve body further includes (1) a second fluid inlet defined therein, (2) a mixing segment positioned downstream of both said first fluid inlet and said second fluid inlet, and (3) said mixing segment includes a first fluid channel having a first width, and a second fluid channel having a second width which is different from said first width, further comprising the steps of:

positioning a second water valve in a third valve position so that a second flow of water is advanced into said fluid channel through said second fluid inlet; and mixing said first flow of water with said second flow of water in said mixing segment so as to create said second flow of water.

* * * * *